P. HALE.
TIDE AND WAVE MOTOR.
APPLICATION FILED JUNE 19, 1913.

1,099,085.

Patented June 2, 1914.
5 SHEETS—SHEET 1.

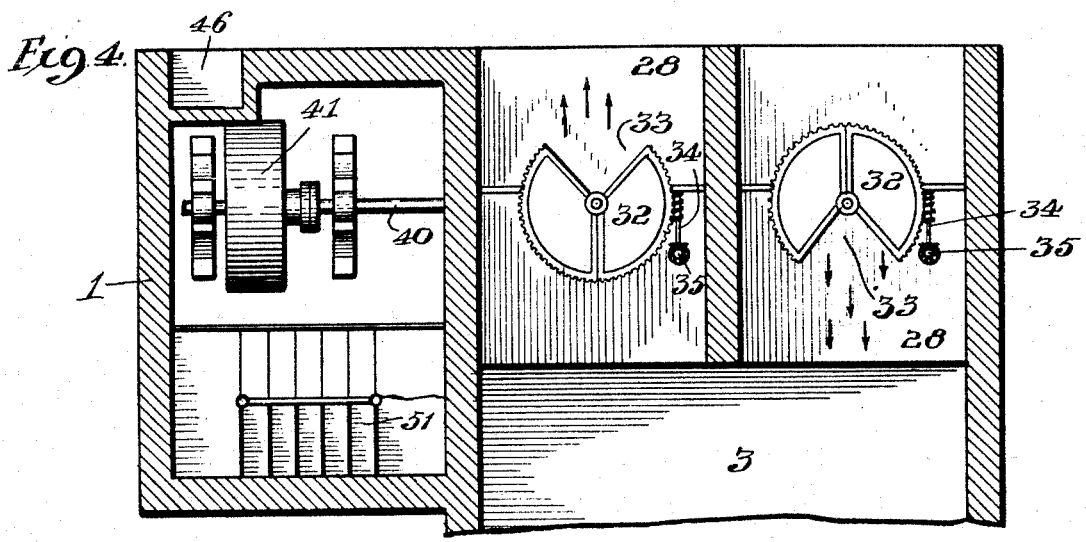
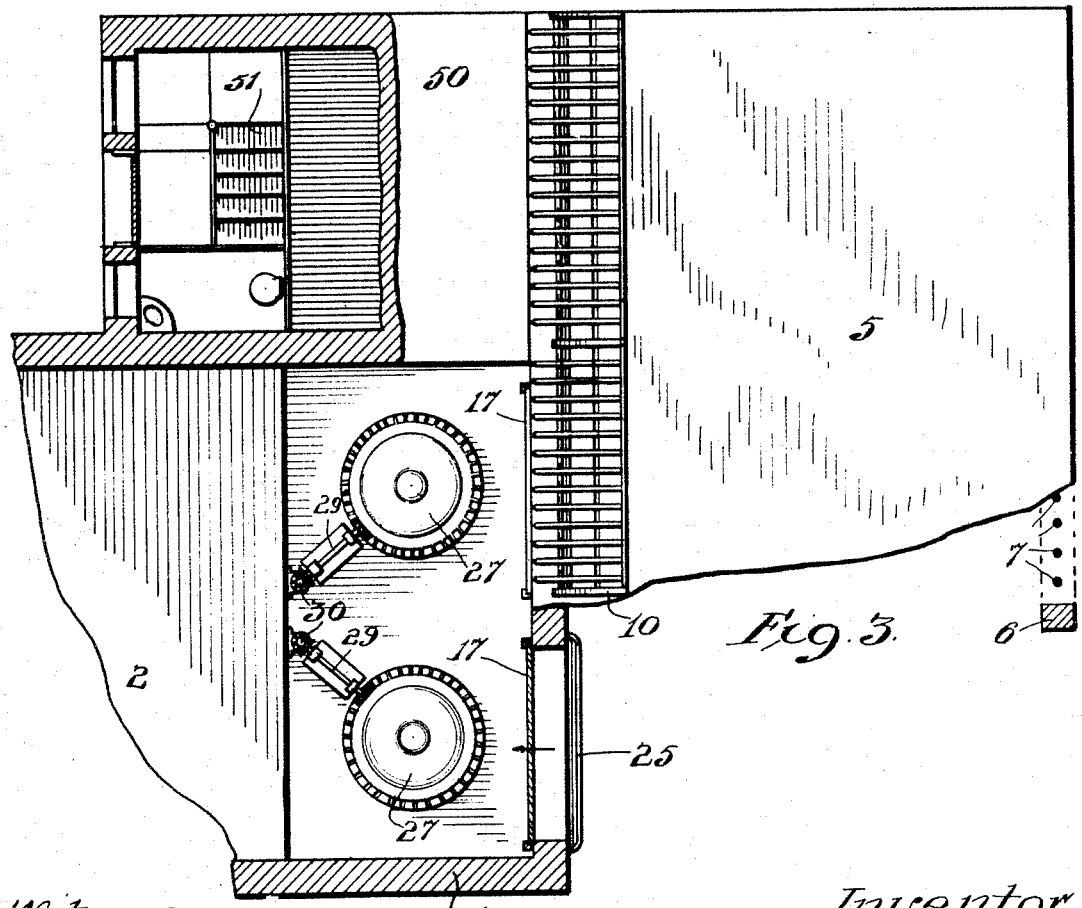

P. HALE.
TIDE AND WAVE MOTOR.
APPLICATION FILED JUNE 19, 1913.
1,099,085.
Patented June 2, 1914.
5 SHEETS—SHEET 4.
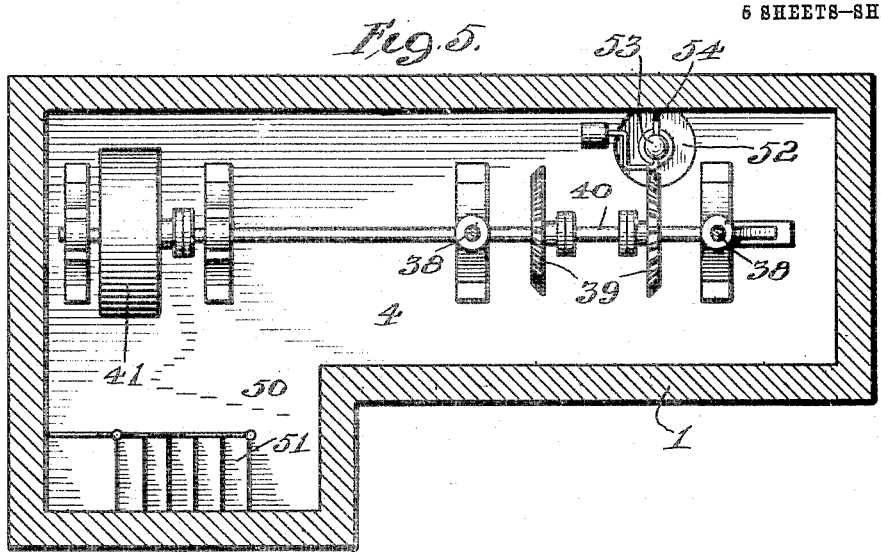
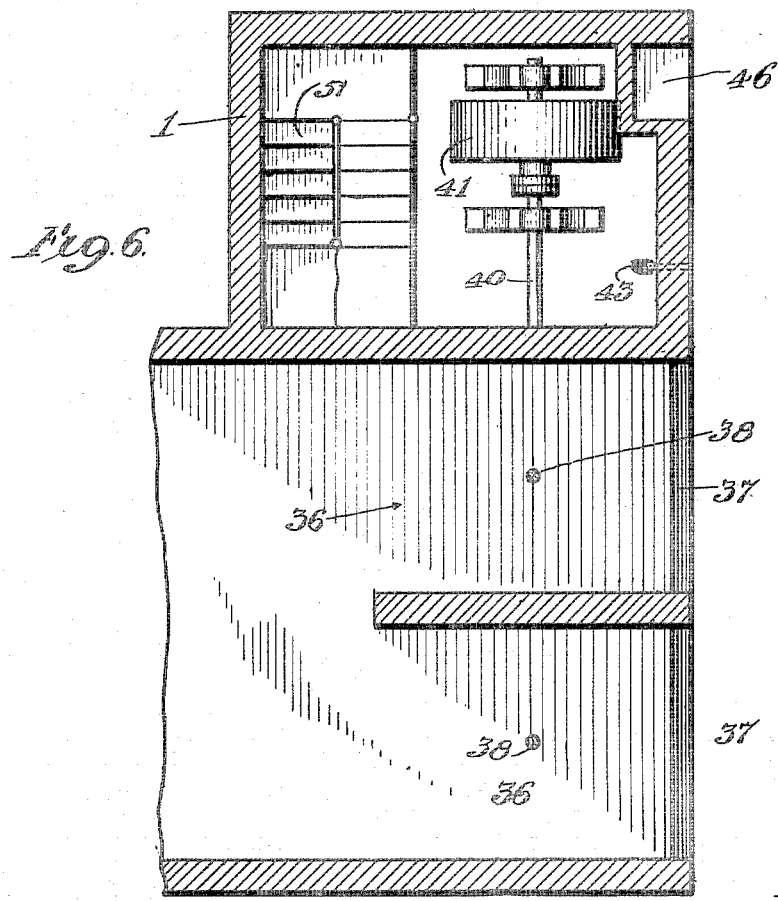
Witnesses:
H. G. Bull.
T. Colson.
Inventor
Perley Hale.
By Joshua R. H. Potts
His Attorney

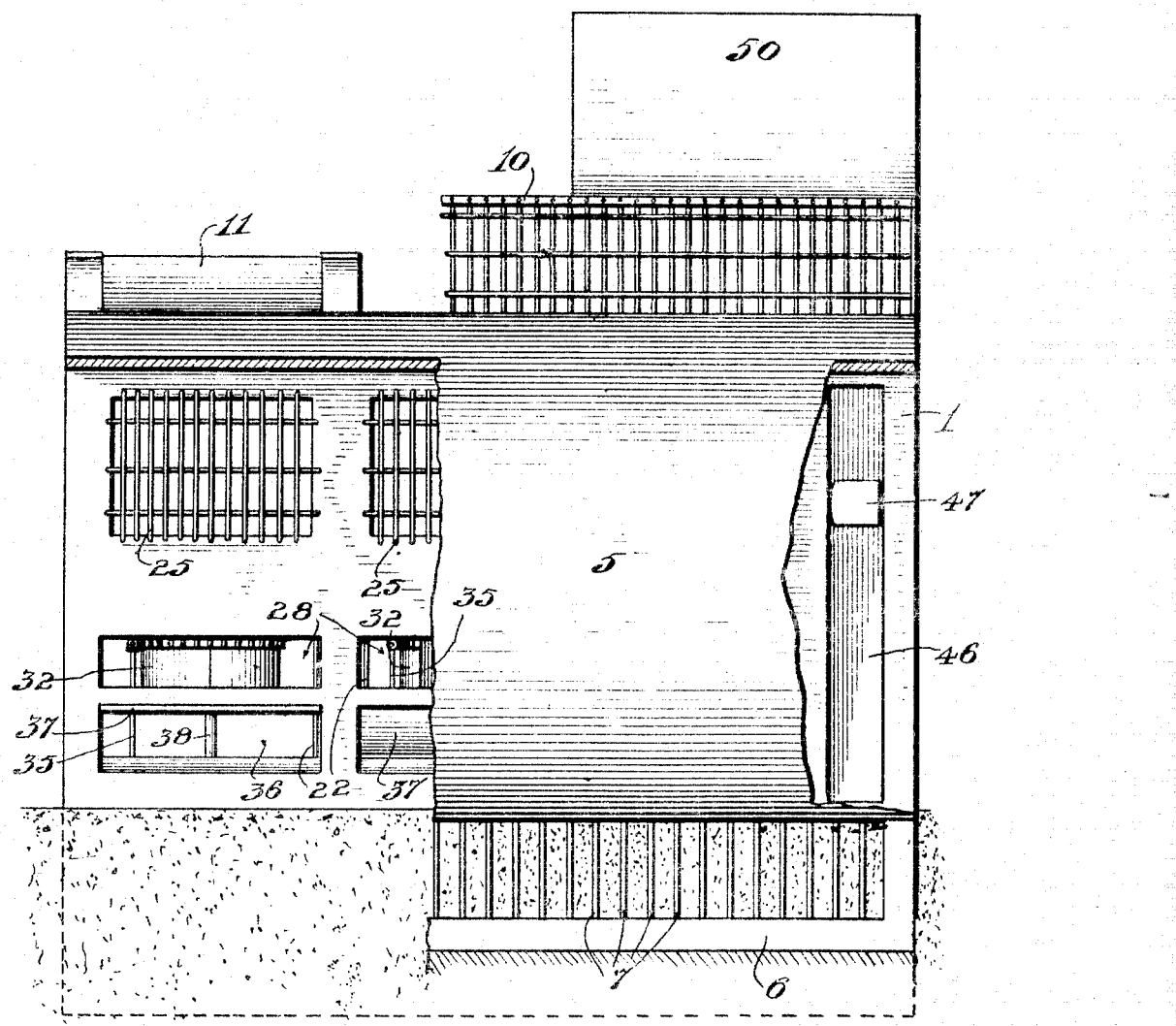

UNITED STATES PATENT OFFICE.

PERLEY HALE, OF SAN DIEGO, CALIFORNIA.

TIDE AND WAVE MOTOR.

1,099,085.        Specification of Letters Patent.        Patented June 2, 1914.

Application filed June 19, 1913. Serial No. 774,526.

*To all whom it may concern:*

Be it known that I, PERLEY HALE, a citizen of the United States, and a resident of the city of San Diego, county of San Diego, and State of California, have invented certain new and useful Improvements in Tide and Wave Motors, of which the following is a specification.

My invention relates to improvements in tide and wave motors and has for its object the provision of a construction of this character which is of simple construction and efficient in operation.

The invention consists in the combinations and arrangements of parts hereinafter described and claimed.

The invention will be best understood by reference to the accompanying drawings forming a part of this specification, and in which—

Figure 1:
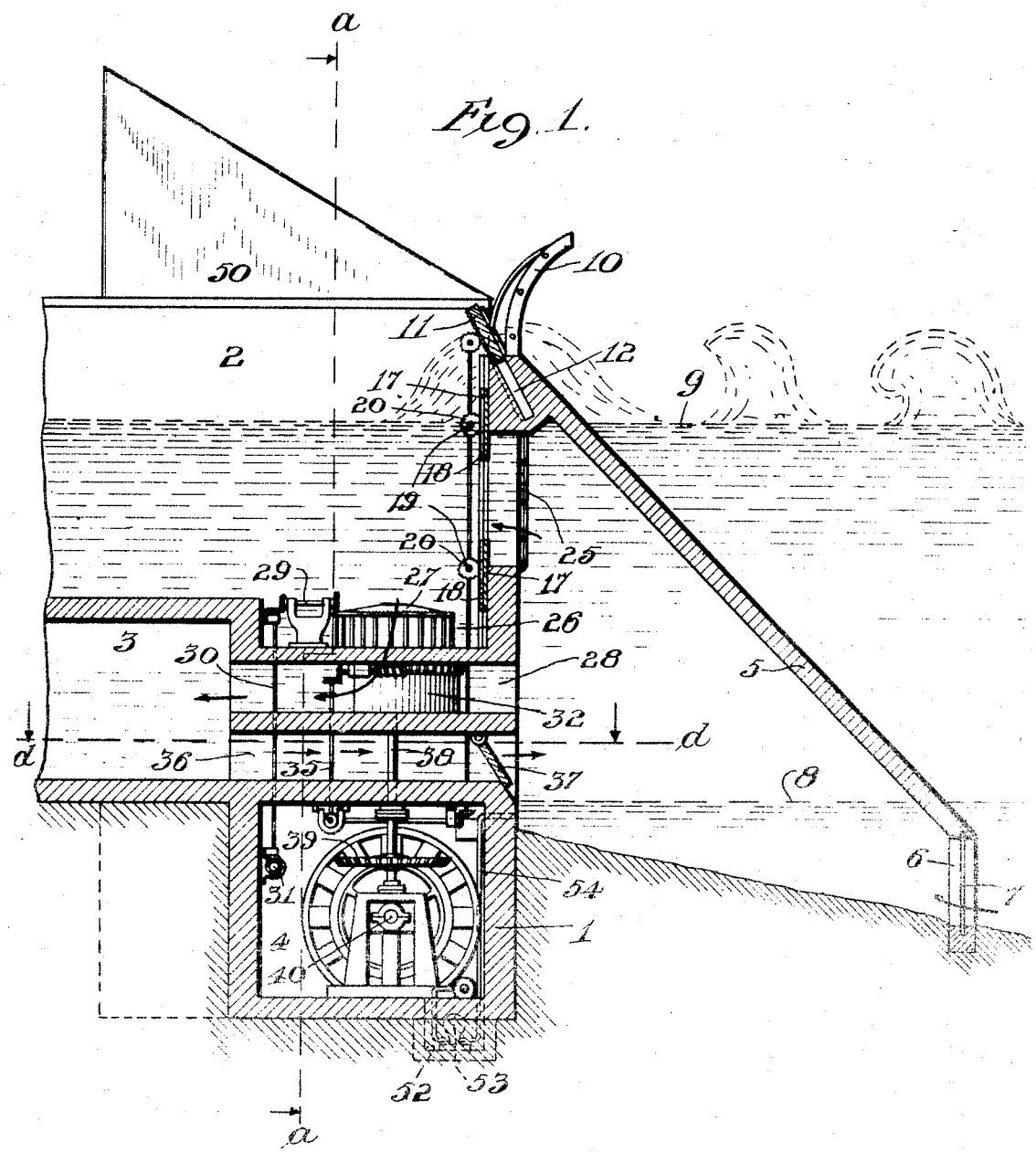
Figure 2:
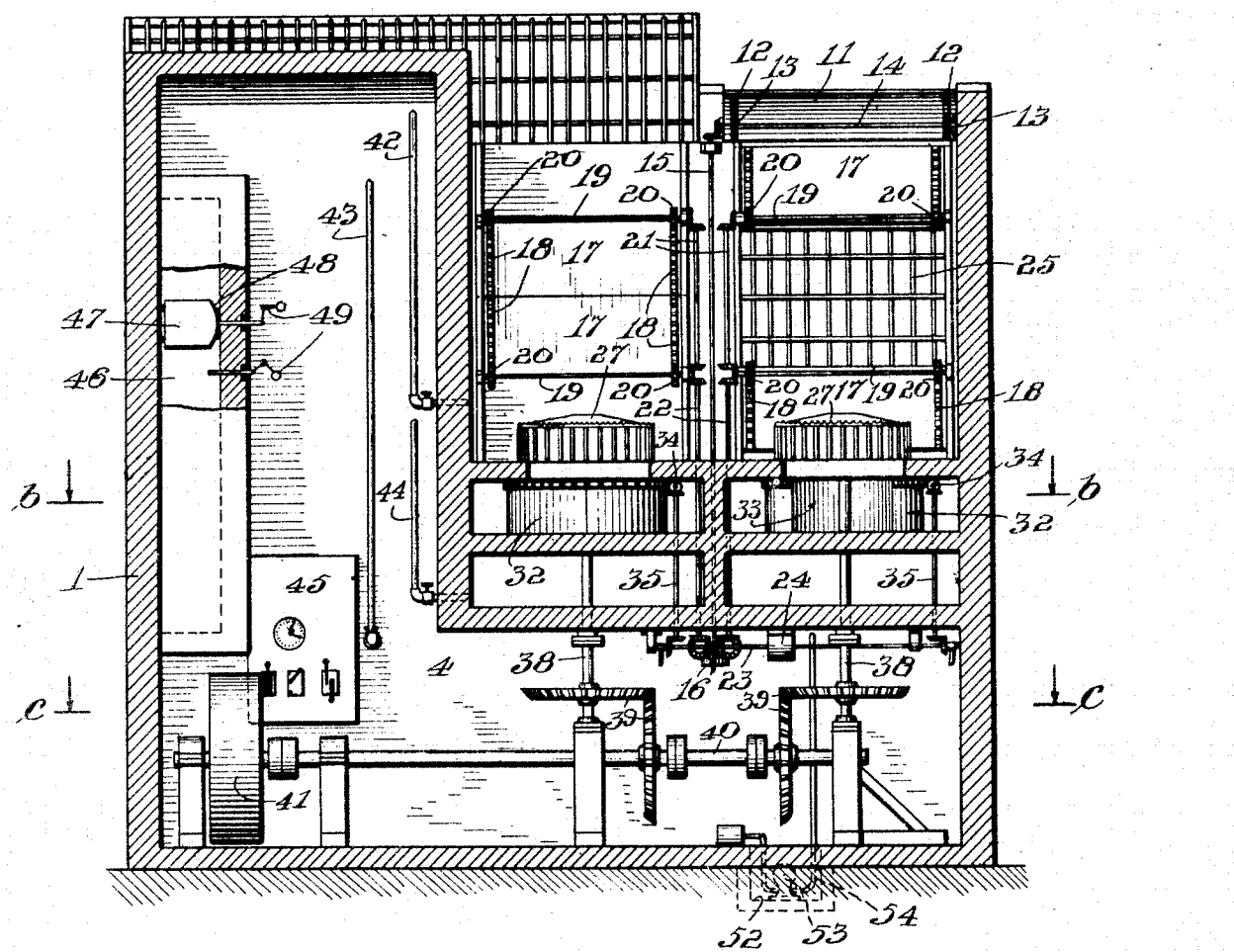

Figure 1 is a longitudinal section through the seaward portion of a construction embodying my invention, Fig. 2, a section taken on line $a$—$a$ of Fig. 1, Fig. 3, a top plan view corresponding to Fig. 1 but shown with portions broken away and shown in section for the sake of clearness, Fig. 4, a section taken on line $b$—$b$ of Fig. 2, Fig. 5, a section taken on line $c$—$c$ of Fig. 2, Fig. 6, a section taken on line $d$—$d$ of Fig. 1, and Fig. 7, an elevation taken from the seaward side of said construction with portions broken away for the sake of clearness.

The preferred form of construction as illustrated in the drawings comprises a building 1 preferably made of reinforced concrete and divided into three main compartments, namely, a storage reservoir 2 located in the upper portion thereof, a waste reservoir 3 located in the medial portion thereof and a power room 4 located in the lower portion thereof. An inclined sea wall or apron 5 is arranged on the seaward side of said building and is adapted to direct waves into storage reservoir 2. The wall 5 is an unbreakable wall and is provided with a passage 6 at its lower end adjacent the bottom of the sea and provided with a grating 7 to prevent the passage of drift or large solid articles. Passage 6 is arranged below the low tide level which is indicated at line 8 on Fig. 1. By this arrangement it will be observed that the force of the waves will be broken before they reach the main building so that said waves will be directed by apron or wall 5 and flow into waste reservoir 3 and that access of comparatively quiet water is always given under wall or apron 5. The wall 5 is extended upwardly somewhat above the high tide level which is indicated at line 9 on Fig. 1. At its upper end wall 5 is provided with an upwardly and outwardly curved end grating 10 which is adapted to intercept logs or heavy drift and turn it back into the sea thus preventing its entry into storage reservoir 2. An extension wall 11 is slidably arranged in the recess 12 provided in the upper portion of wall 5 and is adapted to be extended upwardly to take advantage of comparatively high waves. Extension wall 11 is provided with a plurality of rack bars 12 which are engaged by pinions 13 on a shaft 14 driven by means of a vertical shaft 15 through suitable gearing as shown. Shaft 15 is extended downwardly into the power room 4 where it is driven by means of a motor or other suitable power device 16 located in said power room and controllable therefrom. By this arrangement it will be observed that in case of comparatively high waves the effective depth of storage reservoir 2 may be increased to correspond.

Arranged in the seaward wall of reservoir 2 are a plurality of flood gates 17 which are slidably arranged thereon over entry openings provided in said wall. The gates 17 carry rack bars 18 and are operable through shafts 19 carrying gears 20 meshing with said rack bars. Shafts 19 are rendered operable by a system of shafts 21 and 22 and suitable gearing as shown in Fig. 2 so that gates 17 may be opened or closed as desired. Shafts 22 extend downwardly into power room 4 where they are operatively connected through independent clutch mechanisms with power shaft 23 which is driven by a suitable motor or suitable source of power located in and controllable from said power room. The openings for gates 17 are covered on their outer sides by gratings 25 which serve to exclude heavy drift or other heavy solid articles. By this arrangement it will be observed that the gates 17 may be readily opened from the power room 4 when the tide is high enough to flow into said reservoir and may then be readily closed at flood tide so as to prevent the direct return of the water in reservoir 2 into the sea as the tide falls. A pit 26 is arranged in reservoir 2 and suitable water turbines or other water power means 27 are mounted in said pit. Flumes 28 lead from waste reservoir 3 to the sea under wall 5 and turbines 27 are rendered operable by shafts 29 and 30 and suitable gearing as shown to receive water from reservoir 2 and discharge it into a corresponding flume 28. Shaft 30 leads downwardly into power room 4 where it is operatively connected with a power shaft 31 arranged in said power room and controllable therefrom. Arranged in each of the flumes 28 is a segmental valve 32 which is in the form of a cylinder having a segment 33 removed therefrom so as to form a discharge pocket. Each of the valves 32 are rendered operable by means of a worm shaft 34 and a vertical shaft 35 leading into power room 4 having a suitable clutch connection with power shaft 23 therein. The arrangement is such that when the valves 32 are turned to the position indicated at the left in Fig. 4 the discharge from the corresponding turbine 27 will pass outwardly into the sea and when said valves are turned to the position indicated at the right in Fig. 4, the discharge from the corresponding turbine will pass into waste reservoir 3 as indicated. By this arrangement it will be observed that when the level of the sea is higher than flume 28, the valves 32 may be turned to permit discharge of water from turbines 27 into waste reservoir 3, and that when the level of water from the sea falls below flume 28 said valves may be turned to permit of discharge of water from said turbines into the open sea.

Arranged under each of the flumes 28 is another flume 36 which is divided at its outer end with an outwardly swinging gate valve 37 which is adapted to permit water to pass outwardly through said flume but prevent entry of water thereto from the sea. By this arrangement it will be observed that when the level of the sea falls below the flumes 36, the waste water in waste reservoir 3 will automatically drain into the sea, leaving said waste reservoir free to again receive water from storage reservoir 2 as explained above, the valve 37 automatically closing upon rise of the tide to prevent entry of sea water directly into waste reservoir 3.

Each of the turbines 27 is provided with a shaft 38 leading into power room 4 and connected by bevel gears 39 with a main shaft 40. Shaft 40 is provided with a pulley 41 from which power may be taken for operating a suitable electric generator as will be readily understood. Power room 4 is provided with three glass gage tubes 42, 43 and 44, tube 42 being connected at its lower end with storage reservoir 2, tube 43 being connected with the outside sea and tube 44 being connected with waste reservoir 3, by which arrangement the operator in power room 4 may readily determine the different levels of water and guide himself accordingly. A suitable switch board 45 is also provided in power room 4 and a recess 46 is arranged in one wall thereof in open communication with the outside sea. A slidable float 48 is arranged in recess 47 and is provided at its under side with a cam surface 48 adapted to contact with indicators 49 to indicate the level of the outside sea as will be readily understood. Power room 4 is provided with a laterally and upwardly exposed opening 50 in which stairs 51 are arranged for giving access to said power room.

The construction disclosed is simple and efficient in use and capable of continuous operation.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A tide motor comprising a storage reservoir; means for admitting high tides to said reservoir and preventing their direct return to the sea; a waste reservoir; a flume connecting said waste reservoir with the sea; water power means arranged to receive water from said storage reservoir and discharge it into said flume; and a reversible valve in said flume adapted to direct said discharge water into said waste reservoir or into the sea, substantially as described.

2. A tide motor comprising a storage reservoir; means for admitting high tides to said reservoir and preventing their direct return to the sea; a waste reservoir arranged on a level below said storage reservoir; a flume passing under said storage reservoir and connecting said waste reservoir with the sea; water power means arranged to receive water from said storage reservoir and discharge it into said flume; and a reversible valve in said flume adapted to direct said discharge water into said waste reservoir or into the sea, substantially as described.

3. A tide motor comprising a storage reservoir; means for admitting high tides to said reservoir and preventing their direct return to the sea; a waste reservoir; a flume connecting said waste reservoir with the sea; a second flume on a lower level connecting said waste reservoir with the sea; a valve for closing said second flume against entry of water into said waste reservoir; water power means arranged to receive water from said storage reservoir and discharge it into said first flume; and a reversible valve in said first mentioned flume adapted to direct said discharge water into said waste reservoir or into the sea, substantially as described.

4. A tide motor comprising a storage reservoir; means for admitting high tides to said reservoir and preventing their direct return to the sea; a waste reservoir arranged on a level below said storage reservoir; a flume passing under said storage reservoir and connecting said waste reservoir with the sea; a second flume on a lower level connecting said waste reservoir with the sea; a valve for closing said second flume against entry of water into said waste reservoir; water power means arranged to receive water from said storage reservoir and discharge it into said first flume; and a reversible valve in said first mentioned flume adapted to direct said discharge water into said waste reservoir or into the sea, substantially as described.

5. A tide motor comprising a storage reservoir; means for admitting high tides to said reservoir and preventing their direct return to the sea; a waste reservoir arranged on a level below said storage reservoir; a flume passing under said storage reservoir and connecting said waste reservoir with the sea; a second flume on a lower level connecting said waste reservoir with the sea; an automatically operating valve for closing said second flume against entry of water to said waste reservoir; water power means arranged to receive water from said storage reservoir and discharge it into said first flume; and a reversible valve in said first mentioned flume adapted to direct said discharge water into said waste reservoir or into the sea, substantially as described.

6. A tide motor comprising a storage reservoir; means for admitting high tides to said reservoir and preventing their direct return to the sea; a waste reservoir arranged on a level below said storage reservoir; a flume passing under said storage reservoir and connecting said waste reservoir with the sea; a second flume on a lower level connecting said waste reservoir with the sea; an automatically operating valve for closing said second flume against entry of water to said waste reservoir; water power means arranged to receive water from said storage reservoir and discharge it into said first flume; and a reversible valve in said first mentioned flume adapted to direct said discharge water into said waste reservoir or into the sea, substantially as described.

7. A tide motor comprising a storage reservoir; gates for admitting or excluding high tides thereto and therefrom; a waste reservoir located on a lower level than said storage reservoir; a power room located on a level below said waste reservoir; a flume leading from said waste reservoir to the sea; water power means arranged to receive water from said storage reservoir and discharge it into said flume; a reversible valve in said flume; and a shaft leading from said power means to said power room, substantially as described.

8. A tide motor comprising a storage reservoir; gates for admitting or excluding high tides thereto and therefrom; a waste reservoir located on a lower level than said storage reservoir; a power room located on a level below said waste reservoir; a flume leading from said waste reservoir to the sea; water power means arranged to receive water from said storage reservoir and discharge it into said flume; a reversible valve in said flume; a shaft leading from said power means to said power room; and an upwardly extending extension to the power room affording access thereto and egress therefrom, substantially as described.

9. A tide motor comprising a storage reservoir; gates for admitting or excluding high tides thereto and therefrom; a waste reservoir located on a lower level than said storage reservoir; a power room located on a level below said waste reservoir; a flume leading from said waste reservoir to the sea; water power means arranged to receive water from said storage reservoir and discharge it into said flume; a reversible valve in said flume; a shaft leading from said power means to said power room; and power operable means controllable from said power room for operating said gates and valve, substantially as described.

10. A tide motor comprising a storage reservoir; gates for admitting or excluding high tides thereto and therefrom; a waste reservoir located on a lower level than said storage reservoir; a power room located on a level below said waste reservoir; a flume leading from said waste reservoir to the sea; water power means arranged to receive water from said storage reservoir and discharge it into said flume; a reversible valve in said flume; a shaft leading from said power means to said power room; and gages in said power room communicating with said storage reservoir, said waste reservoir and the open sea, substantially as described.

11. A tide motor comprising a storage reservoir; gates for admitting or excluding high tides thereto and therefrom; a waste reservoir located on a lower level than said storage reservoir; a power room located on a level below said waste reservoir; a flume leading from said waste reservoir to the sea; water power means arranged to receive water from said storage reservoir and discharge it into said flume; a reversible valve in said flume; a shaft leading from said power means to said power room; power operable means controllable from said power room for operating said gates and valve; and gages in said power room communicating with said storage reservoir, said waste reservoir and the open sea, substantially as described.

12. A tide motor comprising a storage reservoir; gates for admitting or excluding high tides thereto and therefrom; a waste reservoir located on a lower level than said storage reservoir; a power room located on a level below said waste reservoir; a flume leading from said waste reservoir to the sea; water power means arranged to receive water from said storage reservoir and discharge it into said flume; a reversible valve in said flume; a shaft leading from said power means to said power room; gages in said power room communicating with said storage reservoir, said waste reservoir and the open sea; a float chamber communicating with the sea; a float in said float chamber; and indicators in said power room operable by said float, substantially as described.

13. A tide motor comprising a storage reservoir; gates for admitting or excluding high tides thereto and therefrom; a waste reservoir located on a lower level than said storage reservoir; a power room located on a level below said waste reservoir; a flume leading from said waste reservoir to the sea; water power means arranged to receive water from said storage reservoir and discharge it into said flume; a reversible valve in said flume; a shaft leading from said power means to said power room; power operable means controllable from said power room for operating said gates and valves; gages in said power room communicating with said storage reservoir, said waste reservoir and the open sea; a float chamber communicating with the sea; a float in said float chamber; and indicators in said power room operable by said float, substantially as described.

In testimony whereof I have signed my name to this specification in the presence of two subscribing witnesses.

PERLEY HALE.

Witnesses:
  IRMA TINPLETT,
  PERLEY B. HALE.